May 27, 1930.  W. C. MORRIS  1,760,163
FLIGHT ATTITUDE INDICATOR
Filed Jan. 14, 1929   3 Sheets-Sheet 1
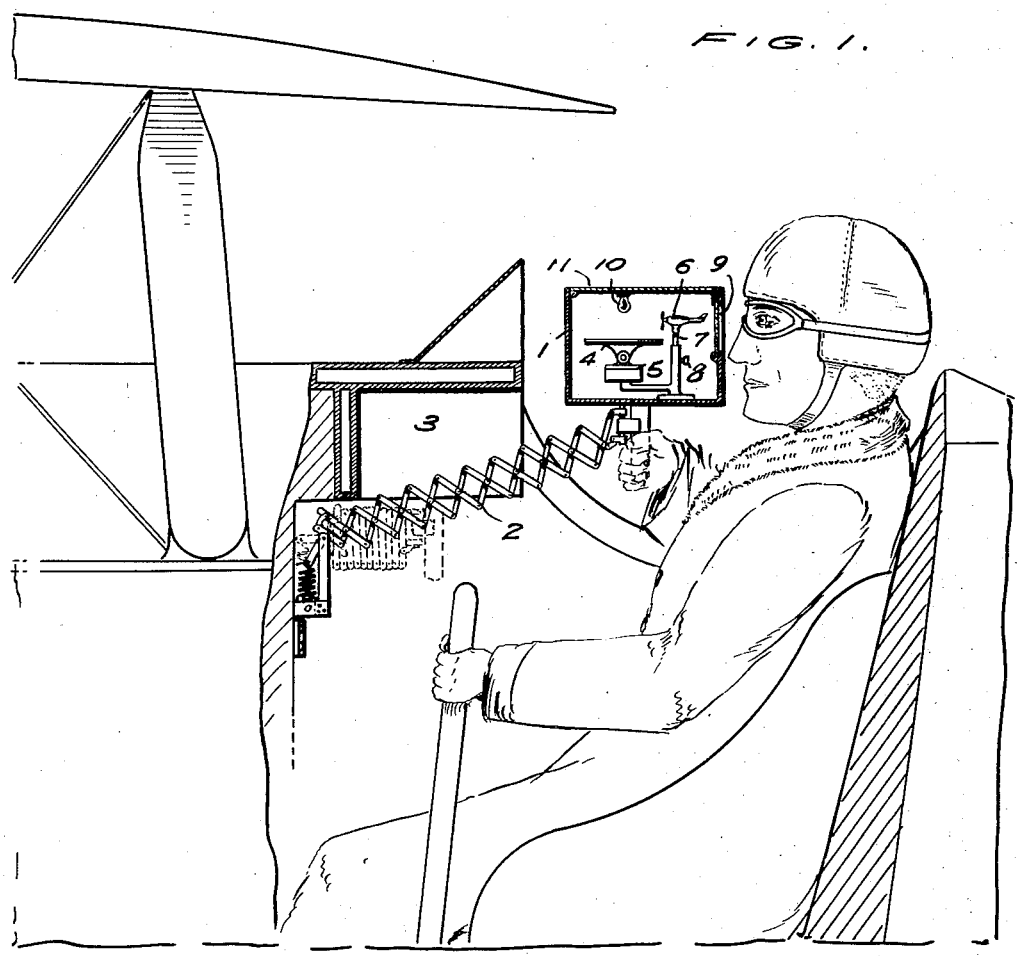
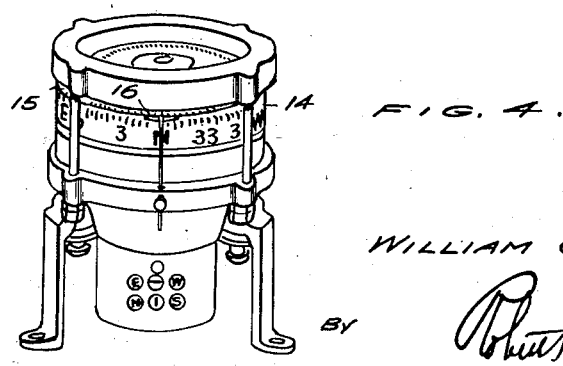
INVENTOR
WILLIAM C. MORRIS
BY
ATTORNEY May 27, 1930. W. C. MORRIS 1,760,163
FLIGHT ATTITUDE INDICATOR
Filed Jan. 14, 1929 3 Sheets-Sheet 2
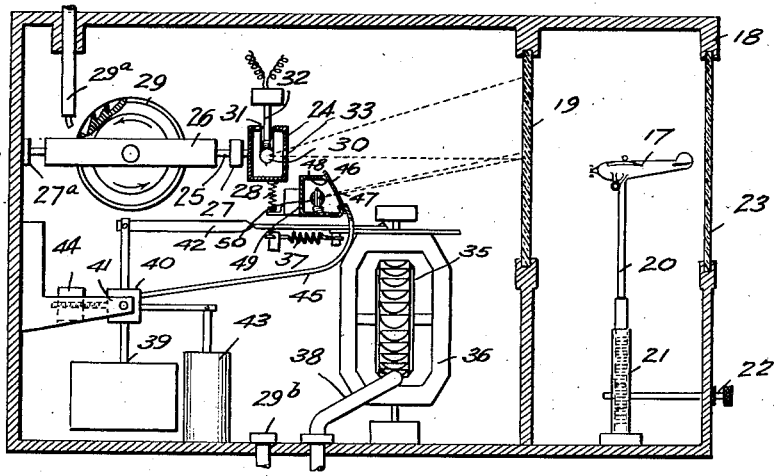
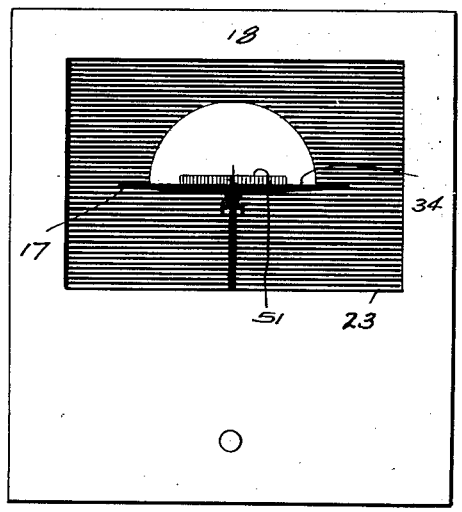
FIG.6.
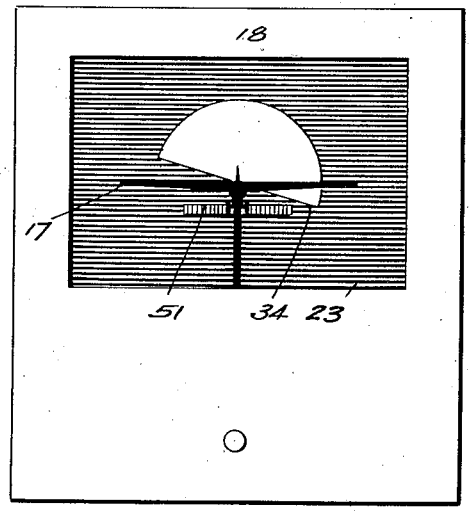
FIG.7.
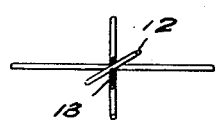
FIG.3.
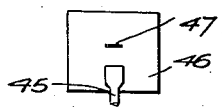
FIG.9.
FIG.2
FIG.8.
INVENTOR
WILLIAM C. MORRIS
BY
ATTORNEY May 27, 1930.  W. C. MORRIS  1,760,163
FLIGHT ATTITUDE INDICATOR
Filed Jan. 14, 1929   3 Sheets-Sheet 3

INVENTOR
WILLIAM C. MORRIS
BY Robert H. Young
ATTORNEY

Patented May 27, 1930

1,760,163

UNITED STATES PATENT OFFICE

WILLIAM C. MORRIS, OF LANGLEY FIELD, VIRGINIA

FLIGHT-ATTITUDE INDICATOR

Application filed January 14, 1929. Serial No. 332,508.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to flight indicators for aircraft.

In the use of the present types of flight, or bank and turn, indicators when flying "blind" in fog or darkness, the pilot must fix his attention upon indicator needles, bubbles, or the like, to know his "attitude" or flying angles laterally and longitudinally. In other words, he is studying mechanical signals which do not represent the attitude of his aircraft in the air in the same manner as a combined glimpse of aircraft and ground. The psychological effect is quite different. The pilot has been trained to observe the relation of the angular position of the axes of his aircraft to the ground plane. He may not always do it consciously, but that is what is happening when the actual earth's surface, or the horizon, cloud strata, and other representations of the ground level, are visible. When deprived of his usual means of registering mentally the attitude of his aircraft, as by dense fog, and compelled to resort to the use of instruments of the type now available, he becomes mechanical in the method of flying and will "break" after a few hours of sustained application to this method. In other words, he will have lost his natural flying sense, temporarily at least, and will have acquired a mental attitude dangerous for his safety.

It is the purpose of the present invention to provide a flight attitude indicator which sets up artificial conditions simulating those which obtain when the pilot is registering an impression of his attitude with the ground in view.

The invention will be understood most readily by reference to the following specification in conjunction with the accompanying drawings, in which:

Figure 1 is a side elevation of one form of the instrument, partly in section, shown in the pilot's cockpit of an airplane;

Figure 2 is a diagrammatic view of the two primary elements of the device in their relative positions as seen by the pilot when the airplane is banked to the right;

Figure 3 is a perspective view of modified forms of the elements which represent the airplane axes and the ground plane;

Figure 4 is a perspective view of an airplane compass, showing the proposed flight indicator built into the compass;

Figure 5 is a sectional view of the preferred form of the flight indicator, in which the ground plane is represented by using beams of light;

Figure 6 is a front elevation of the same showing the ground plane and aircraft axes representations as viewed by the pilot when flying straight and level; and Figure 7 is a similar view when making a gliding turn toward the left;

Figure 8 is a rear elevation of one image-projecting member of Fig. 5;

Figure 9 is a similar view of the other image-projecting member;

Figure 10:
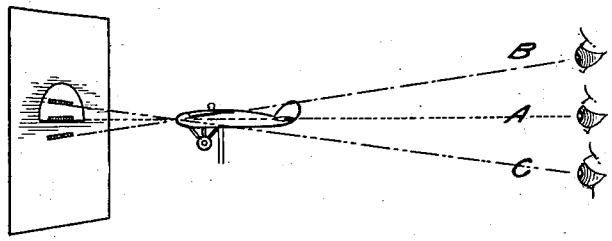
Figure 10 is a diagrammatic view illustrating the method of comparing the miniature airplane of the preferred form of indicator with the light images on the screen for varying flight attitude indications.

In Figure 1 of the drawings the inventive idea is expressed in an elementary form by way of illustration. The casing 1 of the instrument is mounted on an extension member 2, of lazytongs or other suitable construction, so that the instrument may be inserted in a recess 3 in the instrument board of the aircraft when not needed or may be withdrawn into the operative position shown when it is necessary to fly by use of this instrument. Mounted within the casing 1 is a flat plate 4 which represents the surface of the earth, (land or water). This member 4 will hereafter be termed broadly the "ground plane representation." It is maintained level, or parallel to a plane tangent to the earth's surface, at all times in flight by some of the available means, such as the gyroscope 5 shown conventionally in Figure 1. Mounted in substantially fixed relation to the aircraft is a miniature airplane 6 having its longitudinal and lateral axes parallel to the corresponding axes of the former. The miniature airplane should be disposed slightly above the ground representation and nearer the eye of the pilot, as shown, so that it is directly in the line of vision when looking at the ground representation. In order that the miniature airplane may be adjusted for the height of any particular pilot, and also to simulate the effect of changes in altitude above the ground, it may be mounted, as shown, upon an adjustable telescopic standard 7. The standard may be secured in adjusted position by set screw 8.

For convenience, a glass window 9 may be provided in the rear wall of the casing 1 and a light 10 for illuminating the instrument at night may be located under the top closure 11.

In using the instrument for "blind" flying, the pilot glances occasionally at the ground representation and superimposed representation of the airplane. What he obtains is the simulated effect of viewing the actual ground from the air. If the airplane banks over to the right, he sees the "attitude" or angular arrangement of ground representation and miniature airplane depicted in Figure 2. It is natural for the pilot to visualize the attitude of his ship in this manner. Therefore, he is enabled to fly "blind" for periods of long duration without "breaking". It is believed that this should be understood without going into further details.

It is not necessary to use a complete plate to represent the ground plane, nor a miniature airplane to represent the longitudinal and lateral axes of the actual airplane. The ground plane may be represented by two intersecting lines which are the loci of a plane, and may conveniently take the form of wire members 12 as illustrated in Figure 3. The axes of the airplane may likewise be represented by intersecting lines, as by wire members 13 in the same figure.

As shown in Figure 4, an aircraft compass of the usual type may be modified slightly to produce a combined compass and attitude indicator, with the compass card affording the ground plane representation. The card 14 has a flat upper surface 15 which is maintained horizontal by gravity and which is adapted to be the ground plane representation.

An aircraft axes representation member 16 of simplified construction is mounted in appropriate position with respect to the compass card. The member 16 is mounted adjustably on the compass casing. Its longitudinal axis is adapted to serve as the lubber line. In viewing the flight axis representation in the required manner, the compass indication can be read at the same time.

A more highly developed form of the flight indicator is shown in Figures 5 to 7, inclusive. Advantage has been taken of past experience with gyroscopic indicators in an effort to produce a flight indicator of the proposed type which will afford a representation of the ground plane that is sufficiently accurate for practical purposes under the conditions to be encountered in flight. Referring to Figure 5 in particular, it will be seen that the miniature airplane 17 is mounted within the instrument case 18 directly opposite to a plate 19 of translucent material. This plate may be ground glass or may be made of any material which will exhibit to an observer looking at one side thereof a light image caused by projection of a beam of light against its opposite surface. The miniature airplane is shown mounted upon a standard 20 which may be adjusted vertically through the medium of a rack and pinion mechanism 21 by means of the adjusting stem 22. The image receiving plate and the miniature airplane may be viewed readily by the pilot through a window 23 in the case.

On the opposite side of the image receiving plate 19 with respect to the miniature airplane means are provided for projecting the images of certain superficial geometrical figures upon the plate or screen 19 by the use of light rays. The numeral 24 designates an image-projecting member, which is constructed of opaque material and is preferably in the form of a cylindrical box. For reasons which will become apparent, the image-projecting member 24 is attached fixedly to one end of the pivot shaft 25 of the gimbal, or precession frame 26 of a gyrostat. The gimbal should be mounted in bearings 27 and 27$^a$ within the instrument case in such a manner that its axis will be disposed parallel to the longitudinal aircraft axis when the instrument is mounted in appropriate position for observation by the pilot. The gimbal 26 is held normally by spring 28 in such a position that the spin axis of the gyro 29 will be horizontal and thus parallel to the lateral aircraft axis. The other structural details of the gyro are too well known to require lengthy description. A nozzle 29$^a$ directs a stream of air from the outside atmosphere against the vanes of the gyro wheel when the pressure within the instrument case is reduced by suction exerted through the outlet 29$^b$ caused by the usual means (not shown).

The image-projecting member 24 is adapted to contain a sorce of light such as the electric bulb 30. In order to simplify this feature of the construction, the member 24 may be provided with an arcuate slot 31 in the upper half of its cylindrical wall and extending throughout approximately 180 degrees, in order that the light bulb may be mounted upon a supporting stem 32 attached in suitable manner to the instrument case.

The stem 32 should project through the slot into the member 24 with sufficient clearance to permit free oscillation of member 24 around its axis throughout 90 degrees on either side of its normal position as maintained by spring 28. The image-projecting member 24 is fairly well balanced on its pivotal axes. In the wall of the member 24 which faces the image-receiving medium 19, a light aperture 33 is provided. This aperture might have any of various forms but it is considered preferable to give it the shape of a semi-circle. The disposition of this aperture should be such that the straight edge or chord 34 (referring to Figure 8) will be horizontal when the gyro is in its previously described normal position. When light is projected through aperture 33 from the interior source 30, an enlarged image of similar semi-circular form will be projected on the plate 19.

This light image is shown in Figure 6 in the manner in which it will appear to the pilot who is watching the plate 19 from his position in the rear of the instrument. The lower edge 34 of the image, which is the chord of the semi-circle, is intended to represent the horizon as it appears directly ahead of the aircraft in flight. In this figure of drawing the artificial horizon formed by the light image just mentioned is in such angular relation to the lateral axis of the minature airplane 17 that the aircraft is indicated to be flying straight and level as concerns its lateral axis. So long as the aircraft continues to fly in the indicated manner, there will be no change in the apparent relationship of the semi-circular light image with respect to the miniature airplane. If the aircraft should become banked toward the left, that is with its left wing down, a torque will be set up in the gyrostat which will cause the gimbal to oscillate upon its axis in clockwise direction (looking forward in the aircraft). This will cause the image on the receiving medium to change its angular relation to the miniature airplane as shown in Figure 7. This gives the visual impression of being banked to the left.

The indicating means just described only represents one locus of the horizontal reference plane, i. e., the chord of the semi-circular image. Therefore, the angular relation of the lateral axis of the aircraft with respect to the ground plane is indicated, but so far no indication is afforded as to the fore-and-aft attitude of the aircraft. In order to complete the geometrical figure of a plane which will be horizontal, it is necessary to provide an additional locus, which need only be a point not co-linear with the chord of the semi-circle. The practical manner in which this other locus is produced will now be described.

A second gyro 35 is mounted within the instrument case in such a position that the axis of its gimbal 36 is vertical. A spring 37 tends to hold the gimbal in such a position that the spin axis will be parallel to the longitudinal axis of the aircraft. Nozzle 38 causes an air jet to impinge against the vanes of the gyro in the usual manner, whereby the latter is rotated. This gyro is similar to that used in a well known type of pitch indicator. The usual pendulum 39 is supported by rock-shaft 40 in bearings 41. The upper end of the pendulum is connected by connecting rod 42 with the gimbal. The customary dash-pot 43 and counter weight 44 are connected with the rock-shaft 40. The arm 45 projecting from rock-shaft 40 is similar to that usually connected with the pointer of a well known type of pitch indicator. In the present instance this arm is employed to support an image-projecting member 46 which is in the form of a curved plate having a light aperture 47. Member 46 covers an enlarged opening 48 in the rear wall of a box-like shield 49 which contains a source of light, preferably in the form of the electric bulb 50. The member 46 and the walls of shield 49 should be of opaque material in order that the light may cast a sharply defined beam of light through the aperture in the projecting member 46. This beam of light will be projected upon the image receiving plate 19. In order to distinguish the image thus produced from the image produced by member 24, it has been found convenient to use a colored bulb for the source of light 50. The shape of the aperture 47 should be of such geometrical form that the image projected upon plate 19 will constitute a locus of the apparent plane which is partially defined by the straight edge of the image projected by member 24. A dot of light on the plate 19 might be the most desirable figure but it would under some conditions be masked by the miniature airplane 17 or its supporting standard 20. Therefore an elongated bar of light such as that shown in Figures 6 and 7 has been chosen as the most practical form of image. This bar of light should extend horizontally so as to be visible on both sides of the standard 20. In order to produce such an image, the aperture 47 of image-projecting member 46 is in the form of a transverse slot.

The angular position of arm 45, which supports image projecting member 46, should be such that, when the aircraft is flying with its longitudinal axis horizontal, the image of light projected by member 46 will be substantially coincident with the lower edge 34 of the image projected by member 24. In this position of the aircraft, the gimbal 36 of the corresponding gyrostat will be in its normal position shown in Figure 5. Upon depression of the nose of the aircraft as in a glide, the pendulum 39, modified by the effect of the gyrostat, will move upon its axis in such a manner as to cause the arm 45 to swing downward to a degree proportionate to the angle of glide. This action will cause the light image projected by member 46 to move downward on the plate 19 somewhat in the manner shown in Figure 7. In Figures 6 and 7 the light image just mentioned is indicated by the numeral 51. If the aircraft should be banked to the left at the same time, as in a gliding turn, both light images on plate 19 will assume relative positions somewhat like those shown in Figure 7, the precise relationship being dependent upon the degrees of bank and glide. Referring particularly to Figure 7, it will be noted that the straight edge of the semi-circular image and the other image combine to constitute loci of an apparent horizontal reference plane, especially when viewed with the silhouetted miniature airplane in the foreground. It is believed that instant recognition of the attitude of the aircraft should be possible when glancing at the instrument represented in Figure 7 even by any person who has not had practice in the use of the instrument.

Figure 11:
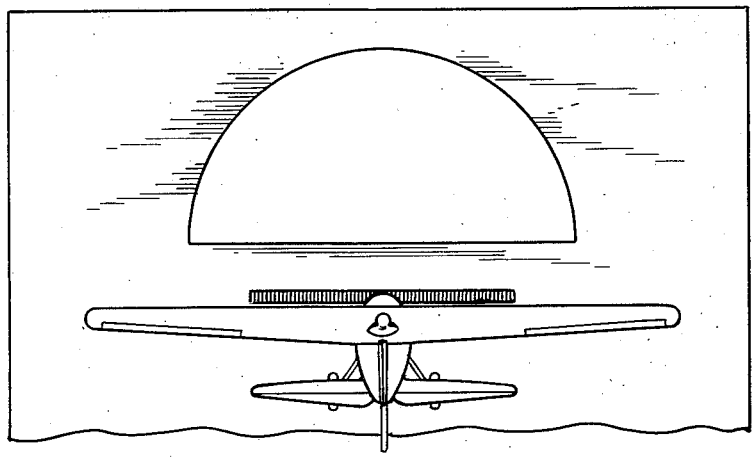
Figure 11 is a perspective view showing just what is actually seen by the pilot when the aircraft is in a straight glide.
Figure 12:
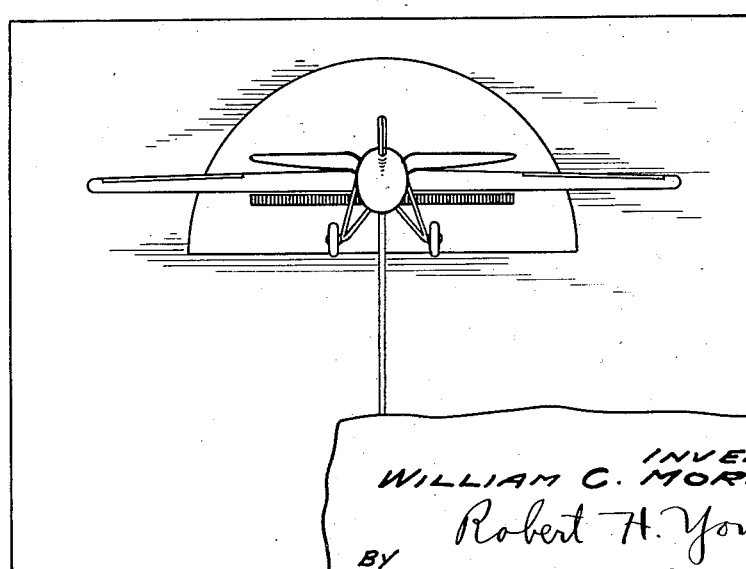
Figure 12 is a similar view when the aircraft is in a straight climb.

In order to obtain the most realistic impression of the aircraft attitude when using the preferred form of the device, the instrument should be viewed in the manner illustrated in Figures 10 to 12 inclusive. For example the pilot should first adjust the miniature airplane by means of the manipulating member 22 (Figure 5) until the nose of the miniature airplane and the artificial horizon, formed by the chord of the semi-circular light image, are in registration, or in the direct line of vision indicated by dotted line A of Figure 10. When, with this adjustment, the actual aircraft is in "flying position" for level flight, the pitch index, or elongated light image will also be in registration with the artificial horizon. After this initial adjustment the nose of the miniature airplane should be kept in visual registration with the pitch index by the pilot during the various maneuvers in his flight. This may be accomplished by raising or lowering the head during gliding or climbing. The result will be that in gliding, the pilot will be looking along the line B of Figure 10 and will see the picture of Figure 11, which gives a natural impression of gliding towards the ground with the nose of the aircraft below the horizon. In climbing, while looking along line C of Figure 10, for instance, the picture of Figure 12 will be seen, in which the aircraft appears to be climbing into the sky above the horizon.

It should be obvious that further modifications and adaptations may be made in practice without departing from the scope of the invention as defined by the appended claims.

I claim:

1. An aircraft attitude indicator comprising a ground plane representation, a representation of the longitudinal and lateral axes of an aircraft in a position for visual comparison with the ground plane representation, and means for adjusting the aircraft axes representation with respect to the ground plane representation in a direction to similate the effect of changes in altitude.

2. An aircraft attitude indicator comprising means for projecting visible light beams, means for controlling the light projecting means to cause the beams to represent loci of an apparent horizontal reference plane, and means for representing the longitudinal and lateral aircraft axes in a position for visual comparison with the horizontal reference plane.

3. An aircraft attitude indicator comprising an image-receiving medium, means for projecting beams of light on the image-receiving medium to form geometrical figures representing the loci of an apparent reference plane, means for controlling the light projecting means to maintain the apparent reference plane horizontal, and means for representing the longitudinal and lateral aircraft axes in a position for visual comparison with the reference plane representation on the image-receiving medium.

4. An aircraft attitude indicator comprising an image receiving medium, means for projecting a beam of light on the image-receiving medium to produce a geometrical figure representing one locus of an apparent reference plane, means responsive to lateral turning of the aircraft to maintain the said locus horizontal, means for projecting a second light beam on the image-receiving medium to produce a geometrical figure representing another locus of the apparent reference plane, and means responsive to pitching of the aircraft to move the second locus-forming image on the image-receiving medium to indicate the direction and degree of pitching.

5. An aircraft attitude indicator comprising an image receiving medium, means for projecting a beam of light on the image-receiving medium to produce a geometrical figure representing one locus of an apparent reference plane, means responsive to lateral turning of the aircraft to maintain the said locus horizontal, means for projecting a second light beam on the image-receiving medium to produce a geometrical figure representing another locus of the apparent reference plane, means responsive to pitching of the aircraft to move the second locus-forming image on the image-receiving medium to indicate the direction and degree of pitching, and means for representing the aircraft axes in position for visual comparison with the plane-representing loci.

6. An aircraft attitude indicator comprising an image-receiving medium, means for projecting a beam of light on the image-receiving medium to produce a geometrical figure representing one locus of an apparent reference plane, a gyrostat responsive to lateral turning of the aircraft and adapted to control the image-projecting means to maintain the said locus horizontal, means for projecting a second light beam on the image-receiving medium to produce a geometrical figure representing another locus of the apparent reference plane, means responsive to pitching of the aircraft to move the second locus-forming image on the image-receiving medium to indicate the direction and degree of pitching, and means for representing the longitudinal and lateral aircraft axes in position for visual comparison with the plane-representing loci.

7. In an aircraft attitude indicator, an image-receiving medium, a source of light, an image-projecting member interposed between the source of light and the image-receiving medium and having an aperture through which light from the source may cast light upon the image-receiving medium, the aperture in the image-projecting member being of a configuration adapted to project a geometric figure upon the image-receiving medium including a straight side adapted to represent a locus of a plane, and means for stabilizing the image-projecting member in flight to maintain the said straight side of the light image on the image-receiving medium in level position.

8. In an aircraft attitude indicator, an image-receiving medium, a source of light, an image-projecting member interposed between the source of light and the image-receiving medium and having a semi-circular aperture adapted to project an image of similar configuration on the image-receiving medium, means for stabilizing the image-projecting member in flight to maintain the chord of the semi-circular aperture horizontal with respect to the earth, a second source of light, a second image-projecting member interposed between the second light source and the image-receiving medium and having an elongated rectangular aperture adapted to project an image of similar configuration on the image-receiving medium, and means for stabilizing the second image-projecting member in flight against pitching movement of the aircraft, the disposition of the aperture in the second image-projecting member being such that the corresponding light image will have its major axis parallel to the lateral aircraft axis.

9. In an aircraft attitude indicator, an image-receiving medium, a source of light, an image-projecting member interposed between the source of light and the image-receiving medium and having a semi-circular aperture adapted to project an image of similar configuration on the image-receiving medium, means for stabilizing the image-projecting member in flight to maintain the chord of the semi-circular aperture horizontal with respect to the earth, a second source of light, a second image-projecting member interposed between the second light source and the image-receiving medium and having an elongated rectangular aperture adapted to project an image of similar configuration on the image-receiving medium, means for stabilizing the second image-projecting member in flight against pitching movement of the aircraft, the disposition of the aperture in the second image projecting member being such that the corresponding light image will have its major axis parallel to the lateral aircraft axis, and a representation of the longitudinal and lateral aircraft axes located in a position for visual comparison with the light images on the image-receiving medium.

10. An aircraft attitude indicator comprising means for representing an artificial horizon, means for maintaining the artificial horizon level during banked turning movement in flight, means for representing a pitch index in proximity to the artificial horizon, and means responsive to pitching movement in flight for maintaining the pitch index in registration with the artificial horizon in level flight and for moving the index above and below the artificial horizon to correspond to climbing and gliding movement of the aircraft, the two maintaining means being separate and uninfluenced by each other.

11. An aircraft attitude indicator comprising means for representing an artificial horizon, means for maintaining the artificial horizon level during banked turning movement in flight, means for representing a pitch index in proximity to the artificial horizon, means responsive to pitching movement in flight for maintaining the pitch index in registration with the artificial horizon in level flight and for moving the index above and below the artificial horizon to correspond to climbing and gliding movement of the aircraft and a miniature representation of the aircraft axes mounted in a position for visual registration with the pitch index.

12. An aircraft attitude indicator comprising means for representing an artificial horizon, means for maintaining the artificial horizon level during banked turning movement in flight, means for representing a pitch index in proximity to the artificial horizon, means responsive to pitching movement in flight for maintaining the pitch index in registration with the artificial horizon in level flight and for moving the index above and below the artificial horizon to correspond to climbing and gliding movement of the aircraft, a miniature representation of the aircraft axes mounted in a position for visual registration with the pitch index, and means for adjusting the aircraft axes representation vertically with respect to the artificial horizon and pitch index.

13. An aircraft attitude indicator comprising means for representing an artificial horizon, means for maintaining the artificial horizon level during banked turning movement in flight, means for representing an elongated pitch index in proximity to the artificial horizon, means for maintaining the pitch index constantly in parallelism with the lateral aircraft axis, and means responsive to pitching movement in flight for maintaining the pitch index in registration with the artificial horizon in level flight and for moving the index above and below the artificial horizon to correspond to climbing and gliding movement of the aircraft, the two maintaining means being separate and uninfluenced by each other.

14. An aircraft attitude indicator comprising an image-receiving medium, means for projecting on the image-receiving medium a light image of definite visual characteristics in the form of a geometrical figure having a straight side representing an artificial horizon, means for controlling the projecting means to maintain the artificial horizon level during banked turning movement in flight, means for projecting on the image-receiving medium a second light image of visual characteristics distinct from those of the first image and in the form of a geometrical figure representing a pitch index, and means responsive to pitching movement in flight for maintaining the pitch index in registration with the artificial horizon in level flight and for moving the index above and below the artificial horizon to correspond to climbing and gliding movement of the aircraft.

15. An aircraft attitude indicator comprising means for representing an artificial horizon, means for maintaining the artificial horizon level during banked turning movement in flight, means for representing a pitch index in proximity to the artificial horizon and in substantially the same plane, means responsive to pitching movement in flight for maintaining the pitch index in registration with the artificial horizon in level flight and for moving the index above and below the artificial horizon to correspond to climbing and gliding movement of the aircraft, and a miniature aircraft representation disposed in spaced relation to the plane of the artificial horizon and pitch index for visual registration with the latter.

16. In a flight attitude indicator for use in an aircraft, a support adapted to be fixedly mounted upon the aircraft, means movable with respect to the support for representing an apparent horizontal reference plane, means of a character which will be uninfluenced by acceleration of the aircraft for stabilizing the reference plane representation means against banked-turning and pitching movements of the aircraft in flight, and a miniature representation of an aircraft fixedly mounted upon the support adjacent to the plane representation means in a position for visual comparison with the latter.

In testimony whereof I affix my signature.
WILLIAM C. MORRIS.